INVENTORS
WAYNE A. McRAE
STUART G. McGRIFF
BY, FRANK B. LEITZ

Norman E. Saliba
ATTORNEY

3,558,279
ELECTROCHEMICAL SENSOR DEVICE
Wayne A. McRae, Lexington, Mass., Stuart G. McGriff, Alexandria, Va., and Frank B. Leitz, Weston, Mass., assignors to Ionics, Incorporated, Watertown, Mass.
Filed June 20, 1967, Ser. No. 647,480
Int. Cl. G01n 31/04
U.S. Cl. 23—254                                              12 Claims

ABSTRACT OF THE DISCLOSURE

An instrument for measuring the concentration of a weakly water-ionizable gaseous component such as carbon dioxide which may be contained in an ambient atmosphere. Such device is independent of the temperature and total pressure of the atmosphere and is based on the measurable changes occurring in the electrical properties of an ion-exchange material when in the presence of the particular gas to be measured.

---

This invention relates to a method and apparatus for metering partially water-ionizable, partially water-soluble gases such as carbon dioxide. In particular, it concerns a sensor device based on the changes in the electrical impedance of a weakly dissociated ion-exchange resin as a function of the change in the partial pressure of an absorbable, ionizable gas in an ambient atmosphere. More specifically, the present sensor is designed to evaluate the response of a weak-base ion-exchange polymer to atmospheric carbon dioxide concentrations in the range of about 0 to 4%.

Although the invention will be described particularly with reference to the measurement of carbon dioxide, it will be clear from the description that it may be readily adapted to other partially water-ionizable, partially water-soluble gases. The prior art carbon dioxide indicators are primarily of the infra-red type and have the disadvantage of being expensive, fragile and easily subjected to maladjustments. Additionally, these indicators possess substantial weight and volume which cannot be tolerated, especially in manned space flights. In contrast, a carbon dioxide meter constructed in accordance with the present invention requires no phototube, which has been heretofore employed, is rugged, simple in design, compact, easy to maintain and provides rapid and reliable results at low cost. The meter, exclusive of a resistance bridge, may be fabricated to a volume of less than about 15 cubic inches, weights less than 6 ounces, has a power requirement of less than 0.5 watt, and its operation is independent of gravity. All of these, of course, give it special use in closed atmospheres such as submarines and manned space applications and as a portable instrument for use in mines, tanks and other substantially closed environments.

The carbon dioxide sensor of the invention is based on measurement of the electrical impedance or resistance of a weakly basic anion-exchange resin membrane. The impedance is dependent on the partial pressure of carbon dioxide in the ambient atmosphere. This dependency of resistance is due to the increased ionization of a weakly ionized base wherein the presence of a slightly acid gas. A weakly acidic resin is preferred for the measurement of weakly basic gases.

Ion-exchange materials are well known in the art and have been used extensively for removing electrolytes from water and industrial solutions. These materials which may be fabricated into various shapes, such as granules, filaments, beads, membrane sheets, and so forth, consist, for example, of a matrix of organic polymer onto which has been attached functional acidic or basic entities, such as sulfonic acid, carboxylic acid or an amine group, and the like. In an organic cation-exchange resin, the functional groups are acidic and the resin may, for example, have the composition R—COO$^-$H$^+$ in the acid form or R—COO$^-$Na$^+$ in the sodium form. The carboxylate group in this example is attached to the polymer chain as a fixed immobilized anion but the positively charged ions (cations) of hydrogen or sodium are mobile when dissociated and can therefore change position within the polymer matrix. Under an ionic concentration gradient or an electrical gradient, the cations can move but the immobile anions remain fixed in the resin matrix. Conversely, in an anion-exchange resin, the conditions are reversed with the anions being the mobile ions. Thus, an anion resin may contain an attached amine group to form a structure R—NH$_3$$^+$OH$^-$ or R—NH$_3$$^+$HCO$_3$$^-$, the former being the generally associated hydroxide form and the latter the generally dissociated bicarbonate form. Inorganic exchanges are also known, such as thorium, hydroxide and the phosphates, arsenates, molybdates, vanadates, niobates, chromates, manganates, tantalates, and/or tungstates of titanium, zirconium, hafnium, tin, thorium, lead and/or cesium and the like. Such inorganic exchangers are entirely suitable for the purposes of this invention.

Synthetic anion-exchange materials are conventionally divided into strong and weak-base materials and both may exist in the hydroxide (OH$^-$) form. However, the strong base material is highly ionized and is in the form: R—N$^+$(CH$_3$)$_3$OH$^-$ where R represents the insoluble network of the material exclusive of the active sites. In the weakly basic form there is little ionization and the material is in the form: R—NH$_3$OH. Such a weakly basic form of an anion material has a dissociation constant in the order of about 10$^{-7}$ to 10$^{-3}$.

A weakly basic anion exchanger in the hydroxide form will equilibrate reversibly with the carbon dioxide in an atmosphere to form an ionized bicarbonate in the reversible reactions:

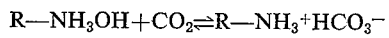
$$R—NH_3OH + CO_2 \rightleftharpoons R—NH_3^+HCO_3^-$$

In a reversible equilibrium reaction, any change in the concentration of one of the components results in a change in the others which is based on thermodynamic factors, assuming equilibrium is achieved. Thus, for a given exchange and temperature, the amount of ionized bicarbonate which will form is a function of the partial pressure of carbon dioxide in the atmosphere surrounding the weakly basic exchanger. As shown in the reaction, the hydroxide form exchanger is only slightly ionized (about 0.3%) whereas the bicarbonate form is more completely ionized. The electrical conductivity of an exchanger is due only to the presence of free (dissociated) ions. In the hydroxide form of the weak anion exchanger, the electrical conductivity is low because of the low concentration of available mobile (dissociated) ions. However, in the bicarbonate form, a substantial quantity of mobile (dissociated) anions are present to give increased electrical conductivity. Since the number of bicarbonate ions is a reversible direct function of the carbon dioxide partial pressure, the electrical conductivity (the reciprocal of the resistance) is also a reversible direct function of the carbon dioxide partial pressure and therefore the concentration of carbon dioxide can be determined from the measured electrical conductance of the weakly basic anion exchanger in the presence of ambient atmospheric carbon dioxide gas or other partially water-soluble, partially ionizable acidic gas.

Thus, the carbon dioxide meter or sensor of the present invention is based upon the change in the number of mobile (dissociated) bicarbonate ions occurring in a weak anion-exchanger as the equilibrium between the exchanger and the carbon dioxide in the atmosphere is shifted due to changes in the ambient carbon dioxide partial pressure. This change in the bicarbonate content of the exchanger will produce substantial changes in the electrochemical properties of the exchanger which may be readily determined by electrical conductivity measurements. For example, the electrical conductivity of an alkyl amine type weak anion-exchanger in the hydroxide form will increase about two-fold when placed in an atmosphere containing carbon dioxide at a partial pressure of about 7.6 mm. of mercury as compared to its value in carbon dioxide free air.

It was found that variations in temperature and total pressure, the former to an appreciable degree and the latter to a lesser degree, affect the resulting changes in the above-noted reversible reactions. Accordingly, it was found desirable in some cases to provide a reference membrane against the actual test membrane (that is, two similar samples of ion-exchange materials), the reference membrane being maintained in a carbon dioxide free environment. In this way, comparing the electrical conductances of the matched membranes reflects the carbon dioxide partial pressure in the ambient of the probe membrane without the necessity of correcting for temperature or total pressure.

It is an object of the present invention to provide a low cost instrument for determining the concentration of any partially water-soluble, partially water-ionizable gas in an atmosphere in which it occurs based on the measurable changes of the electrical impedance of an ion-exchange body which is characterized by being at least partially ionizable by said gas and by having the capacity of entering into an equilibrium absorption relationship with the gas in which at least part but not all of the capacity of the body is ionized by the gas and at least part but not all of the gas is absorbed by the body.

It is also an object of the present invention to provide a carbon dioxide meter based on the measurable changes in electrical properties occurring in a weak anion-exchange resin in the presence of carbon dioxide gas.

A further object is to provide an apparatus and process for measuring the carbon dioxide content of an atmosphere which is more economical, compact and efficient than has heretofore been known.

A further object of this invention is to provide a carbon dioxide sensor device which is independent of such variables as temperature and total pressure of the atmosphere to be tested.

A further object is to provide a sensor device based upon the evaluation of the response of weak base ion-exchange polymers to changes in atmospheric carbon dioxide concentrations in the range of about zero to four percent although not necessarily restricted thereto.

An additional object is to provide a carbon dioxide sensor which is practical, accurate, dependable and effective in its use under weightless manned space cabin conditions.

Other and more specific objects of this invention will appear from the following disclosure and the novel features will be particularly set forth hereinafter in connection with the appended claims.

The invention will be more fully understood from the following detailed description wherein reference is made to the drawings in which.

Figure 3:
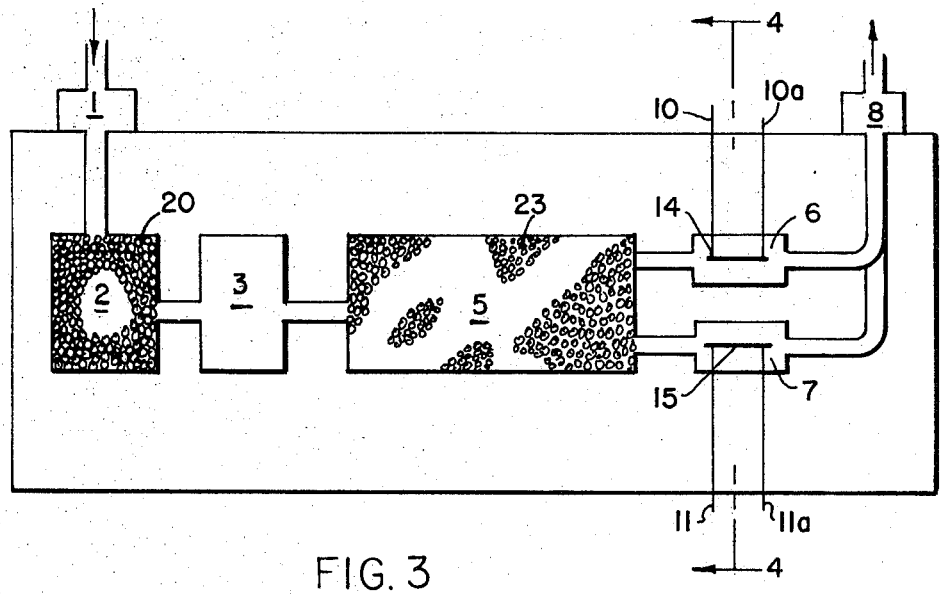
FIG. 3 is a side view showing further details of the cell.
Figure 4:
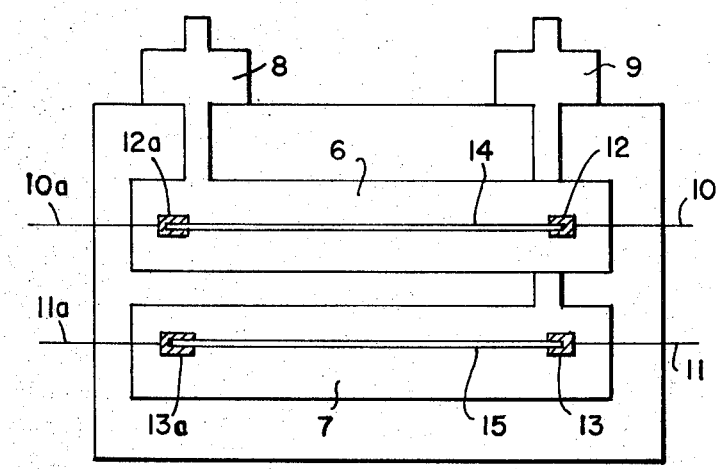
FIG. 4 is an end view of the cell taken along lines 4—4 of FIG. 3.

Broadly considered, the carbon dioxide sensor device consists of two basic elements: (1) the sensor cell A, and (2) the detection and readout system B. The heart of the sensor cell A is a particle of ion-exchanger having a high surface to volume ratio such as a fiber, a bead or a thin sheet such as anionic ion transfer membrane 14 which acts as the sensing element. Optionally and preferably, the cell may contain a reference fiber, bead or membrane 15 (FIGS. 3 and 4). The test membrane absorbs carbon dioxide to an extent which is determined by the pressure (concentration) of that gas in the vicinity of said membrane after equilibration therewith. When dissolved in said membrane, the $CO_2$ causes a decrease in the electrical resistance. Electrical contact to the membrane is made through pieces of metal, or other electronically conducting material, such as platinum screen (12, 12a and 13, 13a) located along a pair of parallel edges of said membrane. The balance of the sensor cell A is occupied by elements necessary in a specific application to maintain the cell in proper operating condition. This preferably includes a strong acid guard chamber 2 to avoid irreversible absorption of contaminates of more strongly acidic gases such as $SO_2$, HCl, HF, $H_2S$, and the like, into the membranes, a humidifier 3 to prevent drying of the membrane, a $CO_2$ absorbing scrubber chamber or reference absorber chamber 5 to provide a $CO_2$-free stream for the reference membrane 15, if any, and a hold-up or dummy test chamber 4, mainly for maintaining thermal equivalence between the test membrane 14 and said reference membrane 15.

Accordingly, temperature compensation is preferably built into the sensor by using a reference ion-exchanger particle maintained at the same temperature as the test particle but with the former immersed in $CO_2$-free ambient. The variation in resistance among membrane strips at a given temperature is at least partly due to variations in thickness and width of the test portions. Accordingly, matched strips are selected for use in the presently disclosed membrane sensor cell. Such strips of membranes could, for example, have effective test portions about 4 mm. wide, 5 mm. long and 0.05 mm. in thickness. Alternatively, beads having diameters in the range of about 0.1 to about 3 mm. may be used in which case electrical contact is preferably made with spring-loaded cylindrical probes or points.

A more comprehensive and detailed description of the invention now follows with like numerals being employed to illustrate like parts in the drawings.

Figure 1:
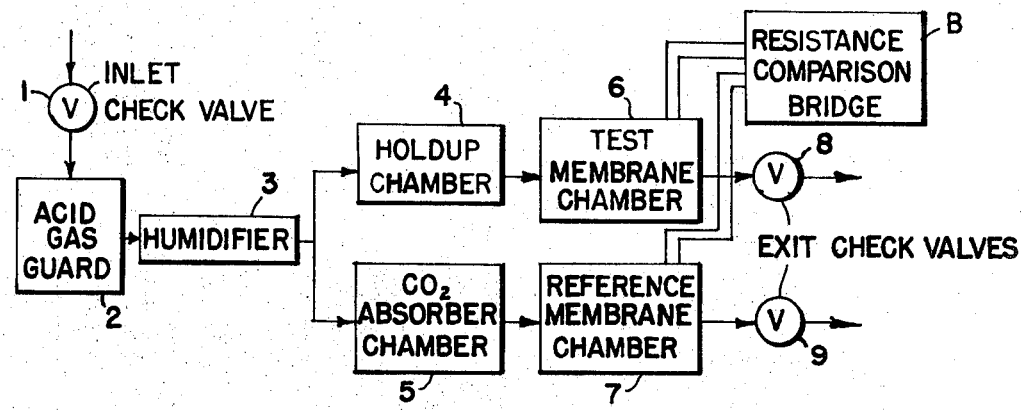
FIG. 1 illustrates the overall flow diagram of the sensor device.
Figure 2:
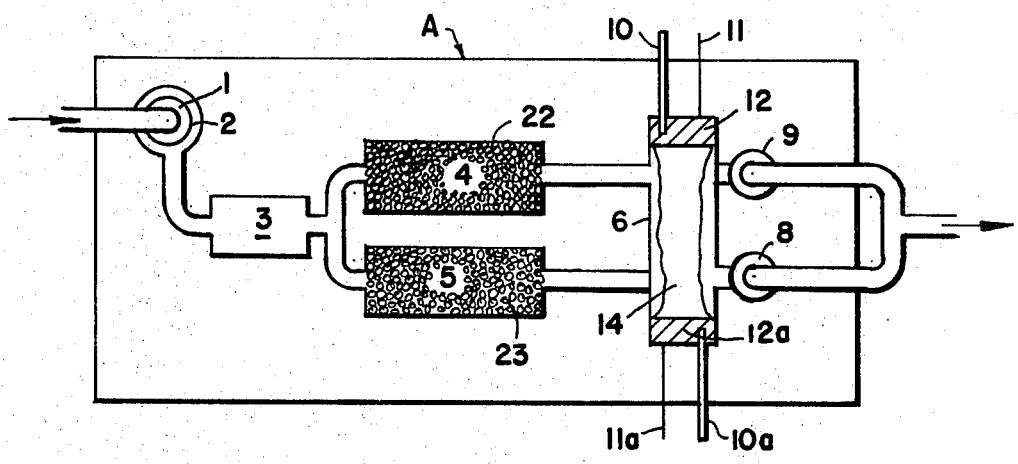
FIG. 2 is a schematic illustration with some details of the top view of the sensor cell.

FIGS. 1 to 3 show the arrangement and flow chart of the passage of the atmospheric gas through a preferred sensor device. In FIG. 1, the resistance comparison bridge B is shown wherein the measured relative resistance of the membrane is a function of the partial pressure of the $CO_2$ in the atmosphere and hence the percentage $CO_2$ of said atmosphere.

The sensor cell A may be fabricated of relatively electrically nonconducting chemically inert material such as polyvinyl chloride or polystyrene plastic and has inlet and outlet check valves 1, 8 and 9 to isolate the sensor cell elements when not in actual use, thus preventing loss of moisture within the cell which could cause the drying out of the membranes with attendant wrinkling and cracking resulting in marked changes in electrical resistance and in other deleterious effects.

The guard chamber 2 contains means for removing strongly acidic interfering gases. Such means may, for example, comprise relatively insoluble weakly basic materials 20, such as granules of silver carbonate, silver bicarbonate, lead carbonate, lead bicarbonate or the like, for absorption and removal of strongly acid gases such as $SO_2$, HCl, HF, and so forth, from the entering atmosphere. If not removed, these gases would later react with the weakly basic test anion exchange membrane of the sensor to cause significant irreversible decreases in the test membrane resistance and result in a cumulative deleterious effect thereon. Since the amount of interfering and contaminating gases normally present in an atmosphere intended for human occupancy is substantially less than the carbon dioxide present, the true effect of the small additional amount of carbon dioxide liberated by the reaction during passage through the absorbent would have negligible effects on the final result.

Next in series to the acid guard chamber 2 is preferably a humidifying chamber 3 containing, for example, chemically inert sponge, felt or other absorbent material which is wet with a dilute solution of a non-volatile strong acid, for example, about 0.01 to 0.7 molar sulfuric acid. The humidifying chamber brings the entering gas to about 100% relative humidity. This is required to maintain a substantially constant water content (about 15 to 50% in the exchanger). Moisturizing with pure water would allow $CO_2$ to dissolve in the water; therefore, an acidic solution is preferred.

The atmospheric gas, scrubbed of its strongly acidic contaminants and humidified but still substantially retaining its original $CO_2$ gas content, is divided into two generally equal streams, one of which is passed through the $CO_2$ scrubber chamber 5 which is preferably filled with a strongly basic ion-exchange resin 23 but may also be filled with other $CO_2$ absorbent material such as lithium hydroxide, barium hydroxide or soda-lime. This filler may comprise granular, spherical, fibrous, woven, expanded, foam shapes, and so forth, of said material. The spherical shapes of the resin are readily available commercially, such as those sold under the trade name of "Dowex-1," "Dowex-2," "Amberlite IRA 410" and "Permutit S." These resins consist of quarternary ammonium exchangers such as a chloromethylated, aminated cross-linked polystyrene in the hydroxide form, which may be obtained by washing the resin first in about 0.2 molar $Na_2CO_3$ and then in about 1 molar NaOH. Such materials effectively remove by absorption the $CO_2$ content from the atmospheric air passed through the absorber chamber 5. This gas stream is subsequently contacted with the reference membrane 15 in reference chamber 7. The remainder of the gas stream from chamber 3 is directed into the dummy chamber 4 (FIG. 2) which is filled with inert neutral beads 22, for example, polystyrene, for thermal similitude in the event of a possible temperature gradient in the cell or gas. The test gas stream from holdup chamber 4 is directed into test chamber 6 (FIGS. 2, 3 and 4) wherein the gas is contacted with test membrane 14. After such contact, the test and reference gases leave the device through check valves 8 and 9.

The structrues 14 and 15 are substantially matched weakly basic anion exchangers in the hydroxide form. Such structures may be, for example, membranes, preferably have ion-exchange sites only on their surfaces to increase sensitivity and to decrease response time. Methods of manufacture of weakly basic anion-exchange structures are disclosed in such patents as United States Nos. 2,730,768, Re. 24,865, 2,780,604, 2,860,097, 2,800,445, and others.

It will be apparent that different weakly basic structures made in accordance with the known prior art will vary in some degree from each other in their usefulness in the sensor but preliminary experimentation with known concentrations of $CO_2$ (such as 0, 1, 2 and 4%) in air will form a basis for selecting a suitable formulation for any contemplated application of the present sensor device. One such preferred weakly basic anion-exchange polymer was found to be a condensation polymer of resorcinol, formaldehyde and triethylenetetramine converted into the hydroxide form. The sensitivity and absorption/desorption time for different exchange formulations were obtained by taking sample strips and converting to the base form with 0.2 M $Na_2CO_3$ and then rinsing with distilled water. Strips ¾ x 3 inch were tested in air containing 4% $CO_2$. Sensitivity was found to be dependent on formulation and curing conditions and independent of the reinforcing or backing material of the membrane. Response time was found to be a function of thickness and hence of backing material but not significantly on the formulation of the ion-exchange membranes.

Figure 5:
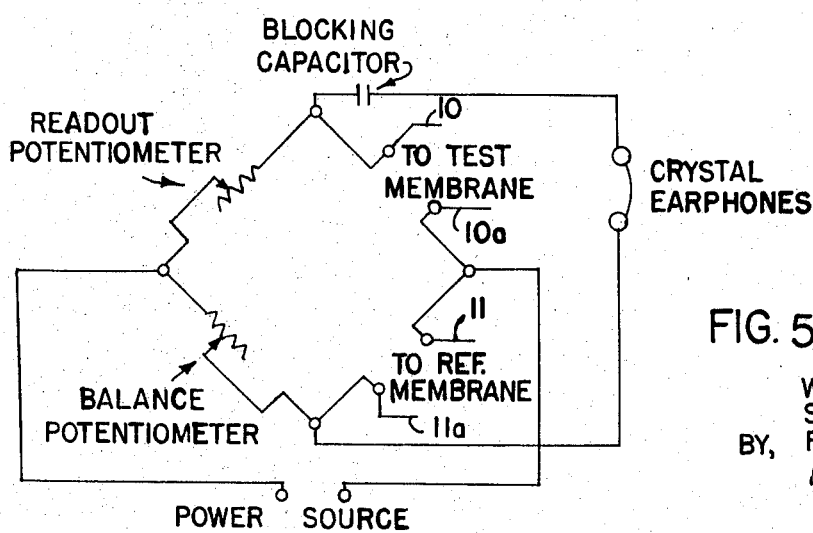
FIG. 5 is an electrical circuit diagram of a resistance comparison bridge employed in the sensor device.

As shown in FIG. 4, test structure lead wires 10 and 10a extend from test structure electrodes 12 and 12a and similary reference lead wires 11 and 11a extend from reference electrodes 13 and 13a to connections in the resistance comparison bridge shown in FIG. 5. In this way, alternating currents from the bridge B are passed through the test and reference structures 14 and 15 through their respective lead wires and then back to the resistance comparison potentiometer which is provided with a suitable source of alternating current. The potentiometer and its circuitry are well known devices employed for comparative readouts and invention therein is not specifically claimed herein.

It is understood that the present disclosure is for the purpose of illustration only and that this invention includes all modifications and equivalents which fall within the scope of the appended claims. Sensor devices for gases other than $CO_2$, such as various acidic and basic gases, are readily conceivable employing modified forms of the herein disclosed device. Thus the use of a very weak basic resin which will not absorb $CO_2$ could be employed to measure volatile acidic gases such as $SO_2$ and HCl while weakly acid resins may be used to measure ammonia and/or volatile amines.

What is claimed is:

1. Apparatus for measuring the concentration of a partially water ionizable, partially water-soluble gaseous component in an atmosphere containing at least one other gas comprising:

(a) means for withdrawing a portion of said atmosphere;
   (b) means for removing other gases from said atmosphere portion which are more strongly ionized in water than that of said gaseous component which is to be measured without substantially changing the concentration of said gaseous component;
   (c) means for substantially humidifying said atmosphere portion;
   (d) means for passing said atmosphere portion into a test chamber, said test chamber containing a humidified ion-exchange body, said body characterized by being at least partially ionizable by said gaseous component and by having the capacity of entering into an equilibrium absorption relationship with said partially water-soluble gaseous component in which at least part but not all of the capacity of said body is ionized by said gaseous component and at least part but not all of said gaseous component is absorbed by said body; and
   (e) means for measuring the electrical impedance of said exchange body.

2. A sensor device for determining the concentration of a weakly basic gas in an atmosphere containing a minor portion of said gas comprising:

(a) means for withdrawing a portion of said atmosphere;
   (b) a first chamber section containing means for humidifying said atmosphere portion;
   (c) a second section comprising an absorber reference chamber containing means for absorbing bases which are substantially more strongly ionized than said weakly basic gas;
   (d) a third section having a test membrane chamber containing therein a bead of a weakly acid cation exchange resin in the hydronium form secured therein with electrodes contacting substantially opposed areas on said bead, said electrodes each having electric conducting means extending therefrom to an impedance comparison means;
   (e) means for passing said atmosphere portion containing the weakly basic gas in series through said first, second and third chamber section, and means for removing the atmosphere portion from said third chamber section; and
   (f) means for measuring the electrical impedance across said electrodes.

3. A sensor device for measuring the concentration of a weakly acidic gas in an atmosphere containing at least one other gas comprising:
   (a) a first chamber section containing means therein for removing gases which are more strongly acidic than said gas to be measured from said atmosphere;
   (b) a second chamber section containing means for humidifying said atmosphere;
   (c) a third section comprising an absorber reference chamber and a dummy test chamber containing respectively therein a filler of macroporous ion-exchange material in the hydroxyl form and a filler of neutral inactive macroporous material;
   (d) a fourth section having a reference chamber and a test chamber, each of said chambers containing therein an anion-exchange structure in the hydroxyl form with a pair of electrodes contacting each of said exchange structures, said electrodes each having electric-conducting means extending therefrom to a resistance comparison means;
   (e) means for passing said atmosphere containing the weakly acidic gas in series through said first and second chamber sections, means for dividing the effluent from the latter section into two parts, means whereby one part is passed through said absorber chamber and the other part through said dummy test chamber of the third section, and means whereby the corresponding effluents from said third section pass through the reference and test chambers, respectively, of said fourth section with means for removing the separate atmospheres from each of said latter chambers, and
   (f) means for measuring and comparing the resistances of said anion-exchange structures across said contacting electrodes.

4. The device of claim 3 wherein the ion-exchange structure contained in said chambers of said fourth section is in the form of a thin membrane and where said electrodes contact a pair of parallel edges of said membrane.

5. The device of claim 3 wherein the ion-exchange structure contained in said chambers of said fourth section is in the form of a bead and where said electrodes contact substantially opposite areas of said bead.

6. The sensor device of claim 3 wherein the weakly acidic gas is carbon dioxide.

7. The sensor device of claim 3 wherein the means contained in said first chamber section for removing the more strongly acidic gases comprise weakly basic materials of the class consisting of silver carbonate, silver bicarbonate, lead carbonate, lead bicarbonate and mixtures thereof.

8. The sensor device of claim 3 wherein the humidifying means contained in said second chamber section comprise a moisture absorbent material wet with a dilute acid solution.

9. The sensor cell of claim 3 wherein the absorber reference chamber ion-exchange material comprises quaternary ammonium anion exchangers in the hydroxyl form and the dummy test chamber contains neutral beads of polystyrene.

10. The sensor device of claim 3 wherein the anion-exchange structure consists of condensation polymers of resorcinol, formaldehyde and triethylenetetramine in the hydroxyl form.

11. The sensor device of claim 3 wherein the means for measuring and comparing the membrane resistances comprise a potentiometer provided with readout and audible balanced bridges.

12. The sensor device of claim 3 wherein the reference and test chambers of said fourth section are located substantially parallel and juxtaposed to each other and of substantially equal volumes.

References Cited

UNITED STATES PATENTS

| | | | |
|---|---|---|---|
| 1,559,461 | 10/1925 | Ruben | 73—26 |
| 2,880,072 | 3/1959 | Grosskopf | 23—254X |
| 3,035,903 | 5/1962 | Rand et al. | 23—232X |
| 3,068,073 | 12/1962 | Stanford | 23—232 |

JOSEPH SCOVRONEK, Primary Examiner

B. S. RICHMAN, Assistant Examiner

U.S. Cl. X.R.

23—232; 72—27; 324—30